United States Patent [19]

Jewell et al.

[11] Patent Number: 4,741,587
[45] Date of Patent: May 3, 1988

[54] OPTICAL COMMUNICATIONS SYSTEM AND METHOD FOR THE GENERATION OF A SEQUENCE OF OPTICAL PULSES BY MEANS OF INDUCED MODULATIONAL INSTABILITY

[75] Inventors: Jack L. Jewell, Bridgewater; Kuochou Tai, Westfield; Akira Tomita, New Providence, all of N.J.

[73] Assignee: American Telephone and Telegraph Company, AT&T Bell Laboratories, Murray Hill, N.J.

[21] Appl. No.: 831,175

[22] Filed: Feb. 20, 1986

[51] Int. Cl.[4] .......................... G02B 6/26; G02F 1/00
[52] U.S. Cl. .............................. 350/96.15; 350/96.16; 350/96.29; 350/320; 455/610; 455/611; 455/612
[58] Field of Search ............... 350/96.10, 96.15, 96.16, 350/96.29, 96.30, 320; 250/227; 455/608, 610, 609, 611, 612, 619; 370/1, 3

[56] References Cited

U.S. PATENT DOCUMENTS

| | | | |
|---|---|---|---|
| 4,255,017 | 3/1981 | Hasegawa | 350/96.29 |
| 4,368,543 | 1/1983 | Hasegawa | 455/612 |
| 4,406,003 | 9/1983 | Eberly et al. | 455/612 X |
| 4,406,516 | 9/1983 | Hasegawa | 350/96.29 |
| 4,558,921 | 12/1985 | Hasegawa et al. | 350/96.29 |
| 4,633,524 | 12/1986 | Hasegawa | 455/612 |
| 4,699,452 | 10/1987 | Mollenauer et al. | 350/96.16 |
| 4,700,339 | 10/1987 | Gordon et al. | 455/612 X |

FOREIGN PATENT DOCUMENTS 2116391  9/1983  United Kingdom ................ 455/612

OTHER PUBLICATIONS

Hasegawa et al., "Amplification and reshaping of optical solitons in a glass fiber" Optics Lett., vol. 7, No. 6, pp. 285-287.
IEEE Journal of Quantum Electronics, vol. QE-16, No. 7, Jul. 1980, "Tunable Coherent IR and FIR Sources Utilizing Modulational Instability" by A. Hasegawa et al., pp. 694–697.
Optics Letters, vol. 7, No. 10, Oct. 1982, "Intensity Discrimination of Optical Pulses with Birefringent Fibers" by R. H. Stolen et al., pp. 512–514.
IEEE Transactions on Microwave Theory and Techniques, vol. MTT-30, No. 8, Aug. 1982, "Waveguide Electrooptic Modulators" by R. C. Alferness, pp. 1121–1137.
Journal of Optical Communications, vol. 4 (1983), "Stimulated Brillouin Scattering in Monomode Optical Fiber" by D. Cotter, pp. 10–19.
Physical Review Letters, vol. 53(16), Oct. 1984, "Cherenkov Radiation from Femtosecond Optical Pulses in Electro-Optic Media" by D. H. Auston et al., pp. 1555–1558.

Primary Examiner—William L. Sikes
Assistant Examiner—Brian M. Healy
Attorney, Agent, or Firm—Eugen E. Pacher

[57] ABSTRACT

Optical pulses of nominal frequency $f_o$ and of predetermined repetition rate $\tau_M^{-1}$ can be generated by means of the induced modulational instability in single mode optical fiber, provided the fiber has anomalous dispersion at $f_o$. A particularly advantageous method for generating such pulses that is capable of very high repetition rates is disclosed. The method involves coupling first and second cw or quasi cw optical radiation, of frequencies $f_1$ and $f_2$, respectively, into the optical fiber. Frequently one of the two radiations has much greater amplitude than the other. The resultant radiation in the fiber has frequency $f_o$ between $f_1$ and $f_2$, and is sinusoidally modulated with frequency $|f_1-f_2|$. Propagation of the resultant radiation through the fiber results in steepening and narrowing of the amplitude peaks. The length of the fiber typically is chosen such that, at the output, the pulse width $\tau_p < \tau_M/4$, preferably $< \tau_M/10$. The inventive pulse generation method can advantageously be used in optical communications systems, e.g., in soliton systems. Other uses, e.g., in information processing apparatus, are also contemplated.

15 Claims, 1 Drawing Sheet

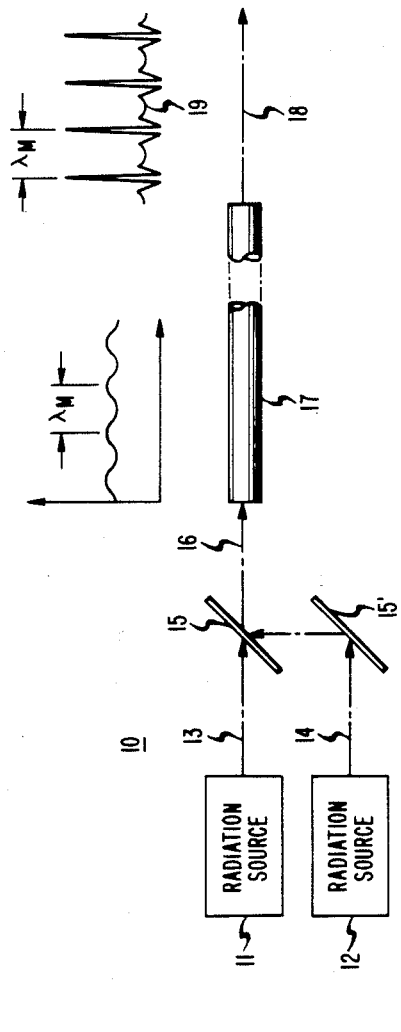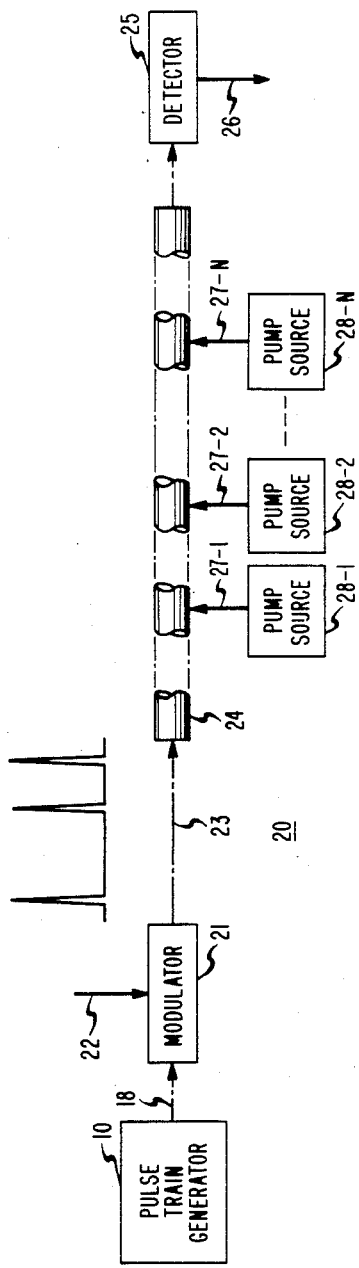

OPTICAL COMMUNICATIONS SYSTEM AND METHOD FOR THE GENERATION OF A SEQUENCE OF OPTICAL PULSES BY MEANS OF INDUCED MODULATIONAL INSTABILITY

FIELD OF THE INVENTION

This invention pertains to methods for generating pulses of electromagnetic radiation, particularly pulses in the optical and infrared spectral region, and to optical fiber communication systems and other systems using such pulses.

BACKGROUND OF THE INVENTION

Pulse trains of electromagnetic radiation, typically in the visible or infrared part of the electromagnetic spectrum, find many uses in science and technology. For instance, almost all existing or planned optical communication systems are of the digital type and thus employ pulses of electromagnetic radiation. Other applications of such pulse trains are, inter alia, in optical radar, optical ranging, optoacoustic spectroscopy, optical computing, and reaction rate studies.

The prior art knows many techniques for forming optical pulses, such as rotating slotted discs, pulsed lasers, diodes, or flash lamps. However, most older prior art techniques cannot conveniently and inexpensively produce a high repetition rate sequence of very short pulses, e.g., with repetition rates of more than $10^9$ sec$^-$, and with pulse widths less than $10^{-9}$ sec.

Recently some methods have been developed that are capable of producing exceedingly short pulses, in the picosecond, and even femtosecond, range. These include pulse compression methods and the soliton laser method. Such ultrashort pulses are of great scientific interest, since they permit previously unattainable time resolution in a number of scientific experiments. However, these methods do not easily lend themselves to the production of pulses having very high repetition rate, e.g., in excess of $10^9$ sec$^{-1}$.

It has recently been discovered that it is possible to transmit information at very high bit rates, of the order of tens or even hundreds of Gbits/s, over single mode optical fiber if shape-preserving pulses, generally referred to as optical solitons, are used. See, for instance, U.S. Pat. Nos. 4,368,543, 4,406,516, and 4,558,921, all co-assigned with this, and incorporated herein by reference.

However, in order to utilize the high data transmission rate of which soliton-based systems are capable, it is necessary to have available pulse-generating means that can produce narrow optical pulses at a very high repetition rate. U.S. patent application Ser. No. 602,694, ('694) filed Apr. 23, 1984 by A. Hasegawa, co-assigned with this, and incorporated herein by reference, discloses that optical pulses can be produced by means of the so-called induced modulational instability of cw (continuous wave) radiation in an appropriate optical medium, e.g., single mode optical fiber.

The modulational instability has previously been used to produce tunable coherent infrared and far infrared electromagnetic radiation. See, U.S. Pat. No. 4,255,017 ('017), issued Mar. 10, 1981, to A. Hasegawa, co-assigned with this, and A. Hasegawa and W. F. Brinkman, *IEEE Journal of Quantum Electronics*, Vol. QE-16(7), pp. 694–697. The method of the '017 patent comprises injection of unmodulated cw radiation of a given wavelength, the carrier, into single mode optical fiber, the carrier wavelength chosen to lie within the regime of anomalous dispersion of the fiber core material. Due to the combined effect of the anomalous dispersion and the nonlinear Kerr effect, side bands of the carrier are produced; in other words, amplitude modulation of the injected unmodulated carrier wave results. Rectification of the modulated carrier yields an output signal of a frequency proportional to the square root of the power in the carrier wave.

The '694 application teaches that a pulse train of predetermined pulse spacing $\tau_M$ (pulse repetition rate $1/\tau_M$) can be created by coupling intensity modulated cw radiation of carrier wavelength $\lambda_o$ into a nonlinear transmission medium having an anomalous dispersion region that includes $\lambda_o$. Pulse formation occurs through interaction of the electromagnetic radiation with the transmission medium. The nonlinearity of the medium produces self-steepening of the amplitude peaks, and the spacing between the intensity peaks of the injected cw radiation determines the spacing between the pulses.

In order to practice the pulse formation method of the '694 patent application it is necessary to modulate the carrier radiation intensity. In some important applications it is necessary to have repetition rates as high as $10^{10}$, or even $10^{11}$ sec$^{-1}$ or more. Modulation at such high modulation frequencies is currently at best difficult to achieve, since electronics capable of operation at such high frequencies is not available. A method for forming a train of optical pulses by means of the induced modulational instability that does not require the use of high speed electronics would thus be of considerable interest. This application discloses such a method.

GLOSSARY OF TERMS

By "optical" radiation (and equivalent terms) we mean radiation of a wavelength used, or potentially useful, in communication systems using fiberguide as transmission medium and/or in optical computing systems. Typically optical radiation is in the visible and infrared spectral region, from about 0.4 $\mu$m to about 10 $\mu$m wavelength.

"Radiation of nominal frequency $f_o$" is intended to mean "radiation having a finite (but narrow) spectral width, the spectrum approximately centered on $f_o$".

The spacing between two pulses (or intensity peaks) is the spacing between corresponding parts of the two pulses (or intensity peaks) (e.g., peak-to-peak spacing) in vacuum, and can be expressed in terms of a length, e.g., $\lambda_M$, or in terms of a time, e.g., $\tau_M$, where $\tau_M = \lambda_M/c$, c being the speed of light in vacuum.

The intensity peaks in the radiation coupled from the optical fiber at the output location of a pulse generator according to the invention herein are referred to as "pulses".

The width of a pulse $\tau_p$ is the full width at half maximum.

An "optical fiber" is a dielectric filament having a refractive index profile such as to longitudinally guide electromagnetic radiation of the design wavelength $\lambda_o$. A single mode optical fiber is an optical fiber which can carry only one mode (the fundamental mode) of radiation at the design wavelength.

A transmission medium, having an (group velocity) index of refraction N (defined as $c/u_g$, where $u_g$ is the group speed) at the wavelength $\lambda$ has anomalous dispersion at $\lambda$ if $\delta N/\delta f < 0$ at $\lambda$, with f the frequency of the radiation of wavelength $\lambda$. A fiberguide has a spectral region of anomalous dispersion if $\delta N/\delta f<0$ over a range of wavelengths.

"Silica-based" fiberguide herein has a core and cladding that everywhere comprises more than 50% by weight of $SiO_2$.

The term "cw radiation" herein is intended to include radiation that is switched on and off, provided the "on" periods are much longer than $\tau_M$ (preferably $>10\tau_M$). Such switched cw may be referred to as quasi cw.

SUMMARY OF THE INVENTION

We have invented a method for generating a sequence of optical pulses of nominal frequency $f_o$. The inventive method comprises coupling first cw radiation (of frequency $f_1$ and substantially constant amplitude) and second cw radiation (of frequency $f_2 \neq f_1$ and substantially constant amplitude) into an appropriate transmission medium (e.g., single mode optical fiber), the medium selected to have anomalous dispersion in a spectral region that comprises $f_o$, where $f_o$ is between $f_1$ and $f_2$. The first and second radiation can be derived from two separate sources, e.g., two lasers, or from a single source, e.g., a laser oscillating in two or more modes. For instance, it is possible to use a given mode and the related hole-burning mode of a color center laser.

The intensity of the resultant radiation in the medium is sinusoidally modulated, with a period $\tau_M = 1/|f_1 - f_2|$. Thus, the modulation period can easily be tuned by changing one or both of the frequencies. The intensity peaks steepen and grow in the course of propagation of the radiation through the medium, resulting in formation of the sequence of pulses. The length of the propagation path in the transmission medium is selected such that the width $\tau_p$ of the pulses at the output location is at most $\tau_M/4$, preferably less than $\tau_M/10$. In some cases, e.g., when the repetition rate is low, it may be advantageous to provide gain in the fiber to compensate for fiber loss. Such gain can be provided by means of Raman amplification.

The invention has broad applicability, and can be practiced with any transmission medium (e.g., a metal vapor) having the requisite anomalous dispersion and low absorption, as will be appreciated by those skilled in the art. However, the discussion herein will primarily be in terms of the preferred transmission medium, namely, single mode optical fiber. In silica-based single mode fiber, the nonlinear Kerr coefficient is not strongly polarization dependent. Furthermore, the properties of typical fibers result in polarization scrambling. Consequently, the inventive method is relatively insensitive to the polarization state of the input radiation.

The inventive method can advantageously be applied in a high data rate communication system, e.g., a fiberguide system that uses optical soliton pulses. Such a system typically comprises, in addition to means for generating a sequence of radiation pulses by the inventive method, means for modulating the generated sequence of pulses in accordance with a predetermined scheme (e.g., by removal of pulses from the pulse train), means for coupling the modulated pulse train into single mode fiber, and means for detecting radiation pulses after their transmittal through the fiber. Other possible uses of the invention include optical computing.

BRIEF DESCRIPTION OF THE DRAWINGS

FIG. 1 schematically shows a system for producing pulses according to the invention;

FIG. 2 depicts schematically a communication system according to the invention that uses Raman amplification.

DETAILED DESCRIPTION

When cw radiation of substantially constant amplitude and of frequency $f_1$ is co-propagating with cw radiation of substantially constant amplitude and frequency $f_2 \neq f_1$, then the resultant radiation field corresponds to an amplitude modulated carrier of frequency $f_o$ between $f_1$ and $f_2$. For instance, if the first and second radiations are of equal amplitude $A$, then the resultant radiation has frequency $f_o = (f_1 + f_2)/2$, its intensity envelope varying sinusoidally between 0 and $4A^2$ with period $\tau_M = |f_1 - f_2|^{-1}$. If, on the other hand, the amplitude $A_1$ of the first radiation is much greater than the amplitude $A_2$ of the second radiation then $f_o \sim f_1$, and the intensity envelope of the resultant radiation field varies at the frequency $|f_1 - f_2|$ between about $(A_1 + A_2)^2$ and $(A_1 - A_2)^2$.

A principal aspect of the invention is the recognition that the modulated radiation that results when the first and second radiations are combined can be advantageously used to produce a pulse train by means of the induced modulational instability.

An exemplary embodiment of the inventive method is schematically depicted in FIG. 1. Unmodulated first and second cw radiations 13 and 14, of frequencies $f_1$ and $f_2$, respectively, are produced by first and second radiation generators 11 and 12, respectively, combined by means of beam splitter 15 and mirror 15' and the resulting radiation 16 coupled into single mode optical fiber 17. The radiation intensity envelope of the resulting radiation, shown above 17, has spacing $\lambda_M$ between adjacent maxima. After propagation through the fiber, the radiation emerges at the output end of the fiber as output radiation 18, with spacing between pulses equal to $\lambda_M$, as is schematically depicted above 18. The output radiation may also contain radiation 19 that is not contracted into the pulses. This radiation will be referred to as the "background", and will be further discussed below. For some choices of input parameters, essentially no background radiation may be present.

Radiation generating means 11 and 12, means for coupling radiation into the fiberguide, attenuators, and other components are well known to those skilled in the art and need no discussion here. For instance, a convenient source for the cw radiation might be solid state lasers emitting in the 1.5 $\mu$m wavelength range, e.g., InGaAsP lasers.

Exemplary optical fiber useful in the practice of the invention is standard low loss silica-based single mode optical fiber of the type familiar to those skilled in the art. $SiO_2$ has a region of anomalous dispersion for wavelengths greater than about 1.3 $\mu$m, extending to wavelengths that are not of interest herein, due to strong multiphonon absorption at these wavelengths. High purity silica fiber has low loss at about 1.55 $\mu$m, and wavelengths between about 1.3 $\mu$m and about 1.7 $\mu$m are therefore of considerable interest for communication purposes, and for the practice of the invention.

As indicated in FIG. 1, the output radiation of a pulse train generator according to the invention may not be completely collapsed into pulses, but a cw background may remain. If present, this background radiation can be removed, for instance, by intensity discriminating means such as were disclosed by R. H. Stolen et al in *Optics Letters*, Vol. 7(10), pp. 512–514 (1982).

Frequently it may be necessary to suppress other nonlinear effects in the transmission medium that compete with the induced modulational instability, primarily Brillouin scattering. Such suppression can be accomplished by known techniques (D. Cotter, *Journal of Optical Communications*, Vol. 4, pp. 10–19 (1983)). For instance, such suppression can be achieved by broadening the carrier line width so as to be greater than the Brillouin gain bandwidth, which is of the order of 10 MHz in silica.

The inventive method can advantageously be used in communications systems, e.g., in systems using single mode optical fiber as transmission medium and soliton pulses as information carrier. A soliton system may use silica-based fiber, and in that case preferably use a carrier wavlength $\lambda_o$ at or near 1.55 μm, but typically between 1.3 and 1.7 μm. The pulse repetition period $\tau_M$ will typically be between about $10^{-12}$ sec and about $10^{-9}$ sec. The pulse width typically is substantially less than $\tau_M$, preferably no more than about 0.2 $\tau_M$, due to the possibility of interaction between adjacent soliton pulses.

A communications system according to the invention typically comprises, in addition to the inventive means for generating a sequence of pulses, described above, means for modulating the sequence of pulses. The modulation is in accordance with a predetermined scheme, whereby information can be impressed upon the pulse sequence. Such modulation can be by any appropriate means, e.g., by means of a waveguide electrooptic modulator (see R. C. Alferness, *IEEE Transactions on Microwave Theory and Techniques*, Vol. MTT-30, No. 8, pp. 1121–1137 (1982)). However, modulation is not necessarily by removal or attenuation of pulses, and the scope of the invention is intended to encompass all suitable modulation schemes. The modulated pulse sequence is coupled into the fiber by known means, transmitted therethrough, and detected by any appropriate means, at a location remote from the input location.

A system according to the invention can be a soliton system or a nonsoliton system. In the former case, the transmission optical fiber also has anomalous dispersion at $f_o$. Soliton systems typically comprise appropriate amplifying or attenuating means, to insure that the pulses, after coupling into the transmission fiber, have the appropriate peak power that results in soliton formation. In a nonsoliton system the transmission fiberguide is chosen to have normal dispersion at $f_o$, or, advantageously, to have the frequency of zero group dispersion at $f_o$.

An exemplary communication system according to the invention is schematically depicted in FIG. 2. Reference numeral 10 refers to the previously discussed pulse train generator according to the invention. Pulse train 18 (pulses not shown) is modified in optical modulator 21 in response to signal 22, modified pulse train 23 is coupled into optical fiber 24 and, after transmission therethrough, coupled from the output end of the fiber, and detected by detector 25, whose output 26 is available for processing by means not shown. Means for coupling radiation from an optical fiber are known and may include wavelength-sensitive or other couplers, or be as simple as an appropriately prepared (e.g., polished) fiber end.

A system according to the invention may also comprise means for removing the background radiation, and means for amplifying the pulses in the fiber, in addition to such well-known components as coupling means, attenuators, switches, taps, and the like. An all-fiber system in which pulse formation, optical switching, and transmission all takes place in optical fiberguide is in principle possible and is a preferred embodiment of the invention.

A particularly advantageous method for amplifying soliton pulses is by means of the stimulated Raman effect. See, for instance, U.S. Pat. No. 4,558,921. Raman amplification requires injection of cw pump radiation into the fiberguide at an intermediate point along the fiber, and can lead, by means of a transfer of energy from the pump radiation to the pulses, to amplification and reshaping of the pulses. This is also schematically shown in FIG. 2, wherein pump sources 28-1 . . . 28-N emit pump radiation 27-1 . . . 27-N, which is coupled into the fiber at intermediate points.

The pump frequency in a Raman amplifier is chosen to be higher than the signal frequency $f_o$. In silica-based fiberguide, for instance, the pump frequency is advantageously chosen to be greater than $f_o$ by about 200–500 $cm^{-1}$. The distance between injection points may be in the range 10–100 km, with 50 km being a typical distance for systems using currently available silica fiber.

The inventive method can potentially be usefully applied also in optical computers or other optical information processing apparatus, where it can be used to supply the required high repetition rate pulses. Such apparatus typically comprises, in addition to the inventive means for producing a sequence of optical pulses, means for modulating the sequence of pulses in response to a signal, means for performing a logic operation on at least some of the pulses of the modulated pulse sequence in response to a further signal, and output means.

Other applications are also possible. For instance, a pulse train generated by the inventive method can be used to generate fast electrical pulses. See, for instance, D. H. Auston et al, *Physical Review Letters*, Vol. 53(16), pp. 1555–1558 (1984).

EXAMPLE

Optical pulses were generated by simultaneously coupling 1.319 μm quasi cw first radiation from a Nd:YAG laser and cw second radiation from an external grating cavity InGaAsP laser diode, tuned to a frequency 0.3 THz below the frequency of the first radiation, into a 1 km length of silica-based single mode fiber (the same results can be achieved by tuning above the frequency of the first radiation).

The quasi cw output of the YAG laser had "on" periods of about 100 ps, and 3 W peak power, the power of the laser diode was 0.5 mW. The fiber had zero dispersion wavelength of 1.275 μm, and the carrier wavelength of 1.319 μm was thus in the anomalous dispersion region of the fiber. The output of the fiber was monitored with a second-harmonic autocorrelator. The observed pulses had a pulse width of about $0.5 \cdot 10^{-12}$ sec, and a period of about $3 \cdot 10^{-12}$ sec. Each pulse train contained about 30 pulses. The pulse peak power was estimated to be about 10 watts.

What is claimed is:

1. Method of producing a sequence of optical pulses having nominal carrier frequency $f_o$ and period $\tau_M$ between adjacent pulses, the method comprising
    (a) providing optical radiation;

(b) coupling, at an input location, the optical radiation into a single mode optical fiber, the optical fiber having anomalous dispersion in a spectral region containing $f_o$, the coupled-in radiation propagating in the optical fiber from the input location to a pulse output location, the length of propagation in the optical fiber to be termed the length of the fiber, and (c) coupling the radiation from the optical fiber at the pulse output location, the coupled-out radiation comprising the sequence of pulses;

characterized in that (d) the provided optical radiation comprises first and second cw or quasi cw optical radiation having first frequency $f_1$ and second frequency $f_2$, respectively, with $f_o$ being a frequency between $f_1$ and $f_2$ and $\tau_M^{-1} = |f_1 - f_2|$; and (e) the length of the fiber is such that the width $\tau_p$ of the pulses in the coupled-out radiation is at most $\tau_M/4$.

2. Method of claim 1, wherein the length of the fiber is such that $\tau_p \leq 0.1 \tau_M$.

3. Method of claim 1, wherein the first and the second optical radiation are produced by a first and a second laser, respectively.

4. Method of claim 1, wherein the first and the second radiation are produced by a single laser.

5. Method of claim 1, further comprising separating the pulses in the coupled-out radiation from a background radiation.

6. Method of claim 5, wherein the pulses are separated from the background radiation by introducing the coupled-out radiation into intensity discriminating means.

7. Method of claim 1, wherein the optical fiber is silica-based optical fiber.

8. Method of claim 7, wherein $c/f_o$ is between about 1.3 and about 1.7 $\mu$m, with c being the speed of light in vacuum.

9. Method of claim 1, wherein $\tau_M$ is between about $10^{-9}$ and about $10^{-12}$ sec.

10. Communications system comprising (a) means for producing a sequence of optical pulses of nominal carrier frequency $f_o$, the period between adjacent pulses in the sequence of pulses being $\tau_M$;

(b) means for modulating the sequence of pulses in response to a signal;

(c) means for coupling the modulated sequence of pulses into a transmission optical fiber at an input location; and (d) means for detecting, at an output location spaced apart from the input location, the coupled-in sequence of pulses transmitted through the transmission optical fiber from the input location to the output location;

characterized in that the means for producing a sequence of pulses comprise (e) means for producing first and second cw or quasi cw optical radiation of frequency $f_1$ and $f_2$, respectively, with $f_o$ being between $f_1$ and $f_2$, and $\tau_M^{-1} = |f_1 - f_2|$;

(f) single mode optical fiber having anomalous dispersion in a spectral region containing $f_o$;

(g) means for coupling the first and the second optical radiation into the single mode optical fiber at a first fiber location, the coupled-in radiation to travel through the single mode fiber to a pulse output location; and (h) means for coupling radiation comprising the sequence of pulses from the single mode optical fiber at the pulse output location.

11. System of claim 10, further comprising means for separating the sequence of pulses coupled from the single mode optical fiber from a background radiation.

12. System of claim 10, wherein the transmission optical fiber is a single mode optical fiber having anomalous dispersion in a spectral region that contains $f_o$, and wherein the pulses in the modulated sequence of pulses have an amplitude and a width such that the pulses coupled into the transmission optical fiber form optical solitons in the transmission optical fiber.

13. System of claim 12, further comprising means, located between the input and output locations of the transmission optical fiber, for amplifying the optical solitons in the transmission optical fiber.

14. System of claim 13, wherein the amplifying means are Raman amplification means.

15. Information processing apparatus comprising (a) means for producing a sequence of optical pulses of nominal carrier frequency $f_o$, the period between adjacent pulses in the sequence of pulses being $\tau_M$;

(b) means for modulating the sequence of pulses in response to a signal;

(c) means for performing a logic operation on at least some of the pulses in the modulated sequence of pulses; and (d) output means chracterized in that the means for producing the sequence of pulses comprise (e) means for producing a first and a second cw or quasi cw optical radiation of frequency $f_1$ and $f_2$, respectively, with $f_o$ being between $f_1$ and $f_2$, and $\tau_M^{-1} = |f_1 - f_2|$;

(f) single mode optical fiber having anomalous dispersion in a spectral region containing $f_o$;

(g) means for coupling the first and the second optical radiation into the single mode optical fiber at an input location, the coupled-in radiation to travel through the single mode optical fiber to a pulse output location; and (h) means for coupling radiation comprising the sequence of pulses from the single mode optical fiber at the pulse output location.

* * * * *